United States Patent
Claeys et al.

(10) Patent No.: US 11,266,073 B2
(45) Date of Patent: Mar. 8, 2022

(54) CROP CUTTING DEVICE, AGRICULTURAL MACHINE COMPRISING SUCH CROP CUTTING DEVICE AND CROP CUTTING METHOD

(71) Applicant: CNH Industrial America LLC, New Holland, PA (US)

(72) Inventors: Danny N. O. Claeys, Oedelem (BE); Jeremy Graulus, Nieuwpoort (BE); Marek Bucharzewski, Plock (PL); Enrico Giuliani, Russi (IT); Jan Vanheule, Maldegem (BE); Hans Joseph De Gersem, Oedelem (BE)

(73) Assignee: CNH Industrial America LLC, New Holland, PA (US)

( * ) Notice: Subject to any disclaimer, the term of this patent is extended or adjusted under 35 U.S.C. 154(b) by 189 days.

(21) Appl. No.: 16/582,466

(22) Filed: Sep. 25, 2019

(65) Prior Publication Data
US 2020/0093068 A1 Mar. 26, 2020

(30) Foreign Application Priority Data
Sep. 25, 2018 (BE) .................................. 2018/5660

(51) Int. Cl.
*A01F 29/09* (2010.01)
*A01D 90/04* (2006.01)
(Continued)

(52) U.S. Cl.
CPC ............ *A01F 29/095* (2013.01); *A01D 90/04* (2013.01); *A01F 15/10* (2013.01); *A01F 29/01* (2013.01)

(58) Field of Classification Search
CPC ........ A01F 29/095; A01F 15/10; A01F 29/01; A01F 2015/107; A01F 2015/108; A01D 90/04; A01D 43/08
See application file for complete search history.

(56) References Cited

U.S. PATENT DOCUMENTS 5,819,517 A * 10/1998 Amanatidis ............ A01D 90/04
56/341
5,974,776 A * 11/1999 Prellwitz ................ A01D 90/04
460/112
(Continued)

FOREIGN PATENT DOCUMENTS

DE 4302199 A1 7/1994
DE 19805854 C1 5/1999
(Continued)

OTHER PUBLICATIONS

Extended European Search Report for EP19199229.6 dated Nov. 25, 2019 (8 pages).

*Primary Examiner* — Arpad Fabian-Kovacs
(74) *Attorney, Agent, or Firm* — Peter Zacharias; Patrick Sheldrake

(57) ABSTRACT

A crop cutting device including knives pivotally mounted below a crop guiding surface. Each knife is pivotable between a retracted position in which it is located below the guiding surface and an extended position. At least a cutting edge of the knife projects above the surface. A selector mechanism selectively holds spring loaded parts of operating members to maintain the corresponding knife in its retracted inoperative position while the operating member is moved to its second position. The selector mechanism includes a shaft carrying a plurality of cam elements which are mounted on the shaft and arranged to be moved to a position for blocking a respective spring loaded part upon rotation of the shaft from a non-holding to a holding position.

16 Claims, 13 Drawing Sheets

(51) Int. Cl.
*A01F 15/10* (2006.01)
*A01F 29/01* (2006.01)

(56) References Cited

U.S. PATENT DOCUMENTS

| | | | | |
|---|---|---|---|---|
| 6,050,510 | A * | 4/2000 | Bonnewitz | A01D 90/04 241/101.763 |
| 6,370,851 | B1 * | 4/2002 | Uros | A01F 15/106 100/88 |
| 6,594,983 | B1 * | 7/2003 | Krone | A01D 90/04 56/341 |
| 6,912,835 | B1 * | 7/2005 | Chabassier | A01D 90/04 241/243 |
| 7,770,371 | B2 * | 8/2010 | Lucot | A01D 90/04 56/341 |
| 9,468,149 | B2 * | 10/2016 | Derscheid | A01D 89/001 |
| 9,526,214 | B2 * | 12/2016 | McClure | A01F 15/106 |
| 9,549,506 | B2 * | 1/2017 | McClure | A01F 15/106 |
| 10,462,974 | B2 * | 11/2019 | Schinstock | A01D 90/04 |
| 2008/0028737 | A1 * | 2/2008 | Viaud | A01F 15/106 56/341 |
| 2012/0056024 | A1 * | 3/2012 | Isaac | A01F 12/40 241/25 |
| 2013/0167498 | A1 * | 7/2013 | Haycocks | A01F 15/10 56/341 |
| 2016/0029567 | A1 * | 2/2016 | Meiners | A01F 29/01 56/500 |
| 2016/0219792 | A1 * | 8/2016 | Singh | A01F 29/04 |
| 2018/0027742 | A1 * | 2/2018 | Schinstock | A01F 15/10 |

FOREIGN PATENT DOCUMENTS

| | | | |
|---|---|---|---|
| DE | 19832463 A1 | 1/2000 | |
| DE | 202014006083 U1 | 12/2015 | |
| EP | 1584226 A2 * | 10/2005 | A01D 90/04 |
| EP | 1609354 A2 | 12/2005 | |
| EP | 2110014 A1 | 10/2009 | |
| EP | 2653025 A1 | 10/2013 | |
| EP | 2656725 A1 | 10/2013 | |

* cited by examiner

CROP CUTTING DEVICE, AGRICULTURAL MACHINE COMPRISING SUCH CROP CUTTING DEVICE AND CROP CUTTING METHOD

FIELD OF THE INVENTION

The present invention relates to a crop cutting device.

BACKGROUND OF THE INVENTION

Many agricultural harvesting machines which pick up crop from a field, like e.g. balers, forage harvesters or forage wagons are equipped with a cutting device arranged downstream of the pickup device. Such a cutting device allows the harvested crop to be reduced in size before it is further processed. Conventional cutting devices include a series of parallel knives which may be extended into the path that is followed by the crop between pickup and further processing. These knives are individually supported by spring loaded arms to allow them to be moved out of the way when they encounter hard or heavy obstacles. In this way damage to the knives is prevented. Many conventional cutting devices are arranged for selectively disabling some of the knives in order to allow the distance between adjacent knives and the cutting length to be increased.

DE 43 02 199 A1 discloses a crop cutting device including chopping knives protruding into a conveyor passage and cooperating with tines on a rotor. The knives are held in the working position by controlled supports, which release them together or individually to swing into the idle position. An elastic overload-protection system also allows the knives to swing briefly into this position on encountering foreign bodies. Each support consists of a spring-loaded thrust rod, engaging at one end in a positioning recess in its respective knife. The rods are supported by their springs on a common connecting cross-member, which is slid by one or more rams in relation to the knives. With its spring each thrust rod forms an overload-protection mechanism movable in relation to the cross-member. Each thrust rod is further coupled to a bar releasing or retaining it, so as to cut its knife in and out of use. The bar is provided with a downwardly protruding cam which is brought into and out of engagement with an edge of an opening by a lifting cam on a rotatable control shaft which cooperates with the bar.

DE 198 05 854 C1 discloses a crop cutting device in which each pivotable knife is operable by a spring loaded sliding bar carrying a roller. The end of each sliding bar carrying the roller is supported by an arm that is rotatable about a shaft. Some of the sliding bars have their support arms extend to various depths below the shaft. A blocking bar extending parallel to the shaft may be raised to different heights to bring it into blocking engagement with the extended arms of the various sliding bars, to block pivoting movement of the corresponding knife.

EP 2 653 025 A1 discloses a cutting device for a harvested crop which includes a camshaft that is operable to lift selected spring loaded arms from a position in which they are bypassed by an actuator into a position in which they are engaged by the actuator and brought into contact with respective knives. In this way only selected knives are extended. In the retracted position the knives still protrude slightly from the slotted plate in which they are arranged, thus forming an obstacle to the flow of the crop. This prior art device is fairly complex and is prone to failure as the spring loaded arms are repeatedly disengaged and the re-engaged by the actuator.

EP 2 110 014 A1 discloses a cutting device for a harvested crop which includes a selection shaft that is received in circular openings in levers operating the knives. A narrow channel leads from an edge of each knife to each circular opening. The selection shaft has locally flattened parts which fit in the channels. By rotating the selection shaft it can either be locked in a circular recess to disable the corresponding knife or allowed to pass through the channel when the knife is moved to its extended position. In the retracted position the knives are completely hidden under the lower wall of the crop inlet channel, thus rendering them inaccessible for maintenance or replacement. The design of this prior art device requires relatively much space and the levers and shaft have relatively complex shapes. Moreover, the repeated movement of the shaft through the narrow channels is prone to jamming.

EP 1 609 354 A2 discloses a cutting device for a harvested crop which includes a selector mechanism having blocking tabs. These tabs cooperate with roll pins extending crosswise through support rods engaging the knives. The blocking tabs are integrated into four separate strips fixed on a cylindrical tube. The tube can be lowered or raised to engage or disengage the blocking tabs. Here again, the retracted knives still protrude slightly from the slotted plate in which they are arranged, thus impeding the flow of the crop. Since the tabs are arranged in strips they have a fixed spacing and cannot be rearranged by a user.

SUMMARY OF THE INVENTION

The invention has for its object to provide an improved crop cutting device. In accordance with the invention, this is achieved in a crop cutting device of the type described above in that the cam elements are substantially parallel, and in that each cam element is individually mounted on the shaft. By individually mounting the cam elements on the shaft, they may be rearranged to obtain different cutting lengths, depending on the crop.

In an embodiment of the crop cutting device of the invention at least some of the cam elements comprise a plurality of cams spaced apart in peripheral direction of the shaft. This allows a plurality of arrangements of the cams to be achieved even without rearranging the cam elements on the shaft.

In order to provide a structure that is sufficiently sturdy to securely block the spring loaded part and to avoid undue load concentrations, each cam may have a contact surface extending from the shaft in radial direction and facing the spring loaded part, and an inclined back part.

When each cam element has a central opening of which the shape and dimensions match the cross-sectional shape and dimensions of the shaft, the cam elements can be slid over the shaft to their desired positions.

In an embodiment of the crop cutting device of the invention, the shaft may be axially movable between a locked position in which the cam elements are aligned with the spring loaded parts and an unlocked position in which the cam elements are offset with respect to the spring loaded parts and in which the shaft can rotate. In this way the shaft can be freely rotated to a desired position when it is extended in the axial direction, but will then maintain this position as soon as it is retracted.

In that case the shaft may be biased to its locked position, so that inadvertent rotation of the shaft, e.g. under load, is prevented. The shaft may be biased by a spring acting on a part of the shaft.

In another embodiment of the crop cutting device, the shaft may further be arranged to be latched in its locked position when the operating members are not in their first position. In this way the shaft cannot be rotated to another position—in which previously blocked operating members might be released—when the operating members are being or have been moved. This prevents sudden loads due to unexpected release of one or more operating members.

The crop cutting device may further comprise a position indicator connected to the shaft, so that a user can easily ascertain which arrangement of knives he is selecting.

The crop cutting device according to the invention may also comprise at least one actuator connected to the operating members for collectively moving the operating members between their first and second positions. Such an actuator may move the entire set of operating members against the spring loads of the spring loaded parts. In order to achieve a more uniform load distribution and prevent twisting of the device, it may include two actuators which may be symmetrically arranged.

In a further embodiment of the crop cutting device of the invention, in its retracted inoperative position each knife is located entirely below said guiding surface, and the device further comprises a lifting mechanism for raising at least a part of each knife above the guide surface. By lowering the knives completely, the guiding surface remains smooth and the flow of crop into the agricultural machine is not obstructed in any way. The lifting mechanism then serves to slightly raise the knives, so that they can be picked up and released from their slots if they need to be replaced or sent for maintenance, e.g. sharpening.

In an embodiment of this crop cutting device, the lifting mechanism may comprise a camshaft arranged below the knives and extending substantially perpendicular to the slots, and said camshaft may comprise a cam for each knife. Such a camshaft is structurally simple and robust, and it takes relatively little space.

When at least some of the cams are offset in an angular direction with respect to other cams, they will engage the knives at slightly different moments, thus rendering the load increase more gradual.

Although the lifting mechanism might be manually operable, it can also be releasably connected to the at least one actuator. By providing a releasable connection, the camshaft can be temporarily disconnected from the actuator or connected such that it will not contact the knives during normal operation of the cutting device.

The invention also relates to an agricultural machine of the type which comprises a pickup for collecting a crop. According to the invention, such an agricultural machine can be improved by arranging a crop cutting device of the type described above downstream of the pickup, i.e. between the pickup and further parts of the machine. The agricultural machine can be any harvesting machine, like e.g. a square baler, a round baler, a forage harvester or a forage wagon.

Also, the invention relates to a method of cutting a crop, comprising the steps of:

guiding the crop in a direction of travel over a guide surface from which a plurality of knives extend, the knives being arranged in a row substantially perpendicular to the direction of travel of the crop, so that a cutting length of the crop is defined by a spacing between adjacent knives in the row; and varying the cutting length by preventing at least some of the knives in the row from extending from the guide surface;

wherein the step of varying the cutting length includes mounting cam elements on a rotatable shaft and rotating the shaft from a non-holding position in which the cam elements leave the knives free to extend to a holding position in which the cam elements prevent the at least some of the knives from extending from the guide surface.

By using individual cam elements to adjust the cutting length, many variations can be achieved in relatively simple manner, relatively quickly and at relatively low cost.

In an embodiment of the inventive method, the individual cam elements can have at least two different configurations including different numbers of cams. This allows multiple cutting lengths to be selected.

In a further embodiment of the method of the invention, the individual cam elements can be releasably mounted on the shaft and the step of varying the cutting length can further include releasing the cam elements from the shaft, rearranging the cam elements and remounting the rearranged cam elements on the shaft. By rearranging the cam elements the possibilities of varying the cutting lengths are increased even further.

BRIEF DESCRIPTION OF THE DRAWINGS

The invention will now be illustrated by description of an example, in which reference is made to the annexed drawings, in which.

DETAILED DESCRIPTION OF THE INVENTION

Figure 1:
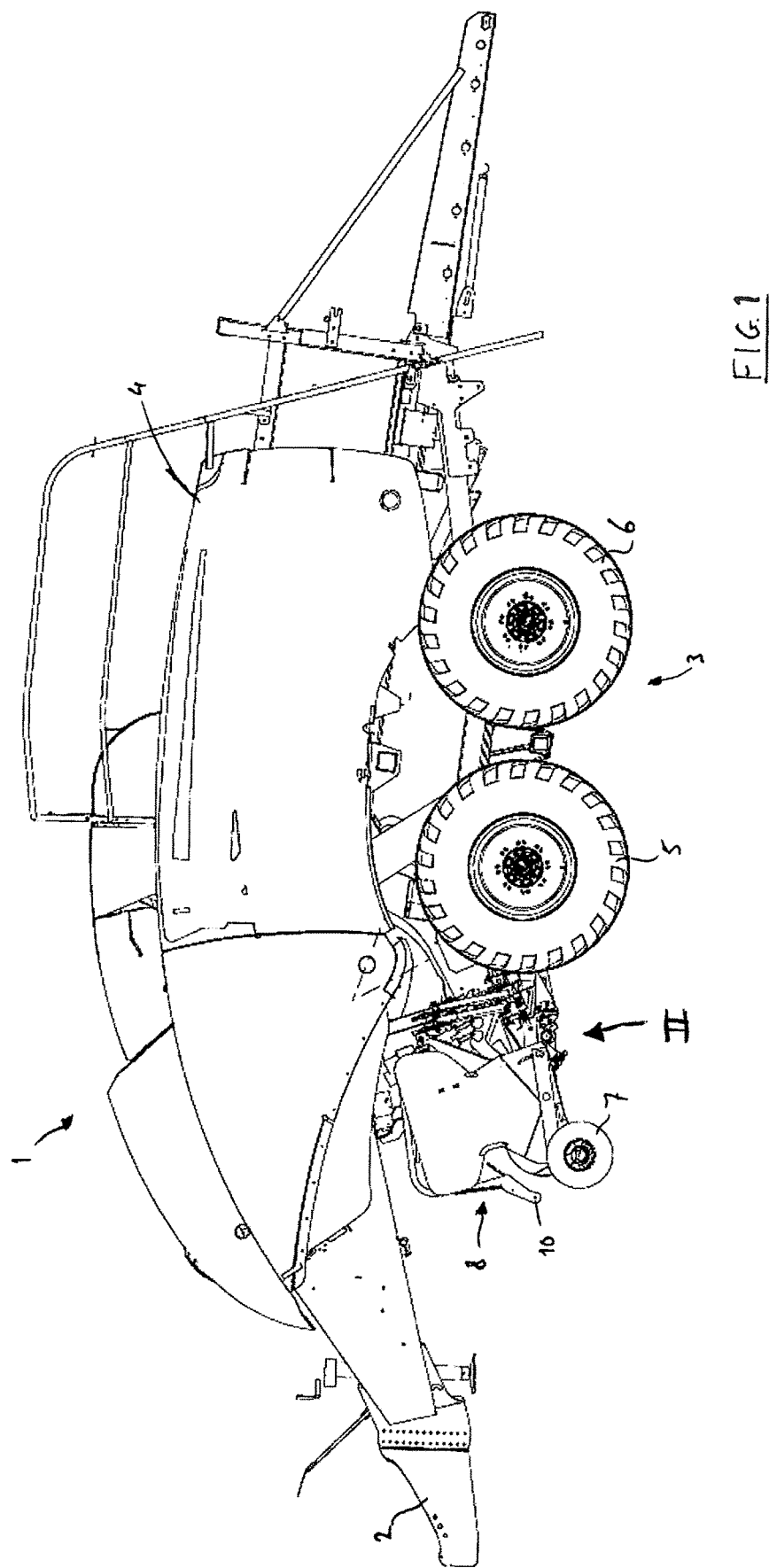
FIG. 1 is a side view of an agricultural machine, in this case a baler, in which the device of the invention can be used.
Figure 2:
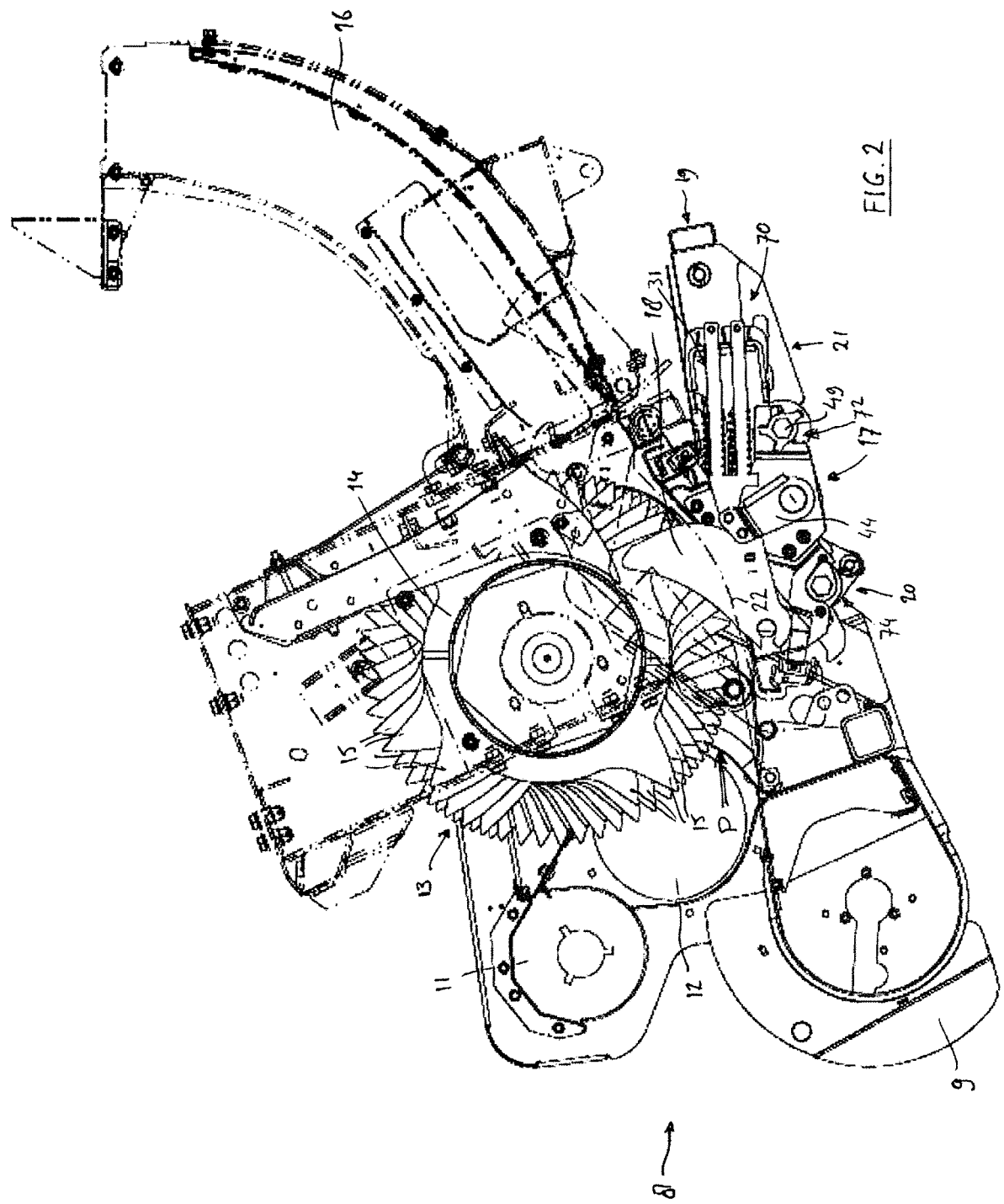
FIG. 2 is a detailed longitudinal view on an enlarged scale of the part of the baler indicated by arrow II in FIG. 1.

An agricultural machine, in this embodiment a baler 1 (FIG. 1) which is intended to be towed by a tractor (not shown) by means of a hitch 2, includes an undercarriage 3 and a body 4. The undercarriage 3 includes tandem axles having main wheels 5, 6, as well as an adjustable pickup wheel 7 at the front of the baler 1. The pickup wheel 7 supports a pickup assembly 8 which includes the actual pickup 9 (FIG. 2), a wind guard 10, a series of guide rolls 11, 12 and a multiblade rotor 13. The rotor 13 includes a plurality of blades or discs 14 having e.g. four tines 15 each, wherein the discs 14 are offset in angular direction. The pickup assembly 8 pulls a harvested crop into an inlet channel 16 which leads to the actual baling mechanism (not shown) which is arranged within the body 4 of the baler 1. A crop cutting device 17 is arranged in the lower part of the pick up assembly 8, opposite the rotor 13. The crop cutting device 17 includes a plurality of mutually parallel knives 18 which have an operative position in which they extend into the path P leading from the pickup 9 to the inlet channel 16. The knives 18 are uniformly distributed over the width of the path P and are spaced such that they are interleaved with the blades 14 of the rotor 13.

The crop cutting device 17 includes a frame 19 having a front part 20 in which the knives 18 are mounted and a rear part 21 housing an actuating mechanism 70 for the knives 18.

The front part 20 is covered by a curved plate 22 which constitutes a guide surface for the crop when the cutting device 17 is arranged in the pickup assembly 8. The rear part 21 is covered by a sheet 71 to protect the actuating mechanism 70 from dirt and dust. A plurality of parallel and equidistant slots 23 are formed in the guide surface 22 to allow the knives 18 to move between the extended, operative position (FIGS. 3, 4) and an inoperative position (FIG. 5) wherein the knives 18 are retracted below the guide surface 22. This movement is a pivoting movement about a pivot shaft 24 which is arranged in the front part 20 of the frame 19 and runs perpendicular to the slots 23—which in turn are oriented in the direction of travel T of the crop over the guide surface 22. A barrier 84 extending parallel to the slots 23 borders the part of the guiding surface 22, which defines bottom of the path P. Each knife 18 has a cutting edge 25, which in this embodiment has a concave curved shape, a rear edge 26 having a convex curved shape and a lower edge 27. A circular opening 28 is formed near the front of the knife 18 and is accessible through a narrowed channel 29. The pivot shaft 24 has a flattened segment 30 at the location of each knife 18, which allows the knife 18 to be removed from the shaft 24 by being pivoted to its substantially vertical position, in which the flattened segment 30 fits through the channel 29.

Figure 3:
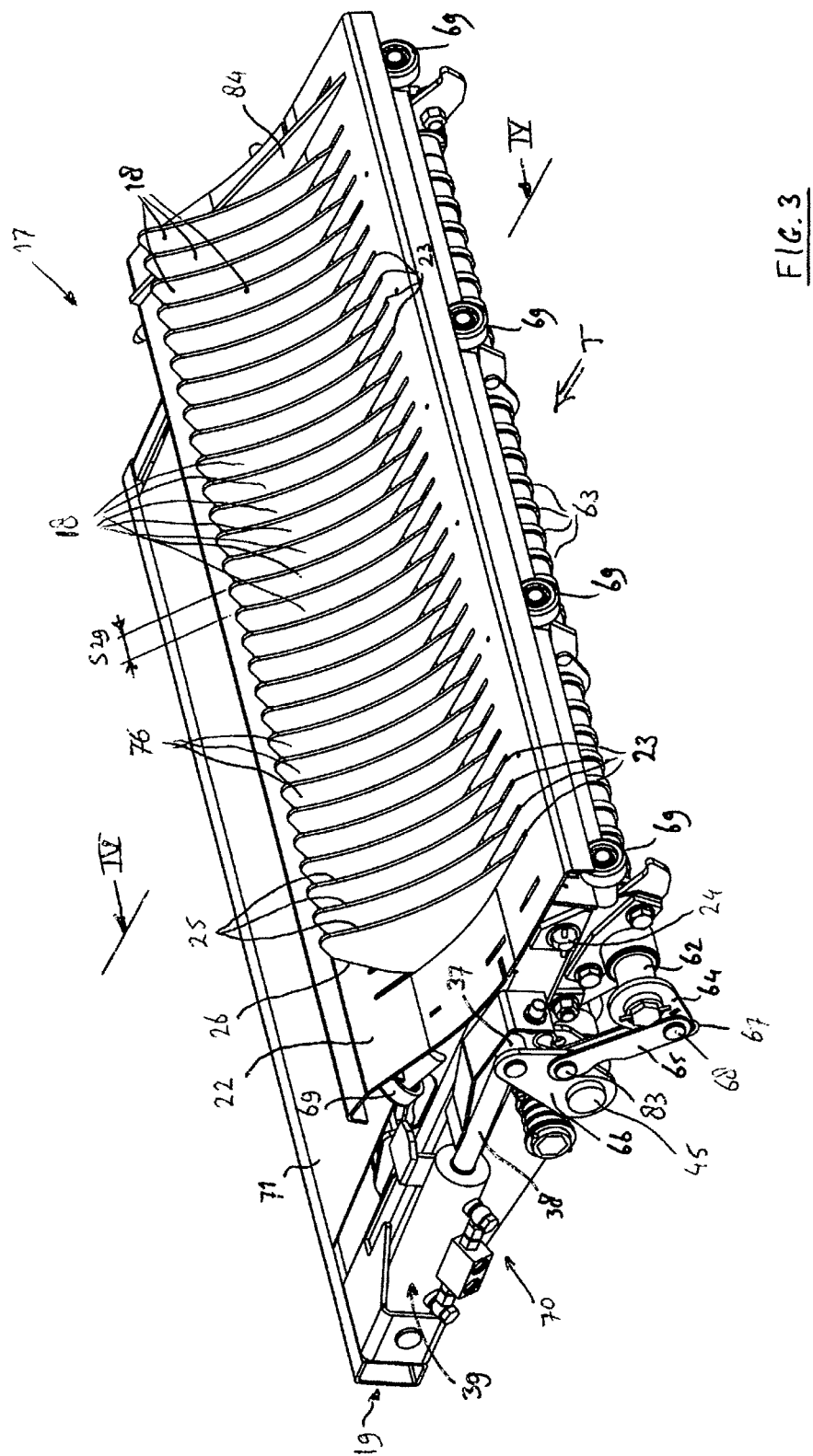
FIG. 3 is a perspective front view of the cutting device with the knives shown in their extended operative position.
Figure 4:
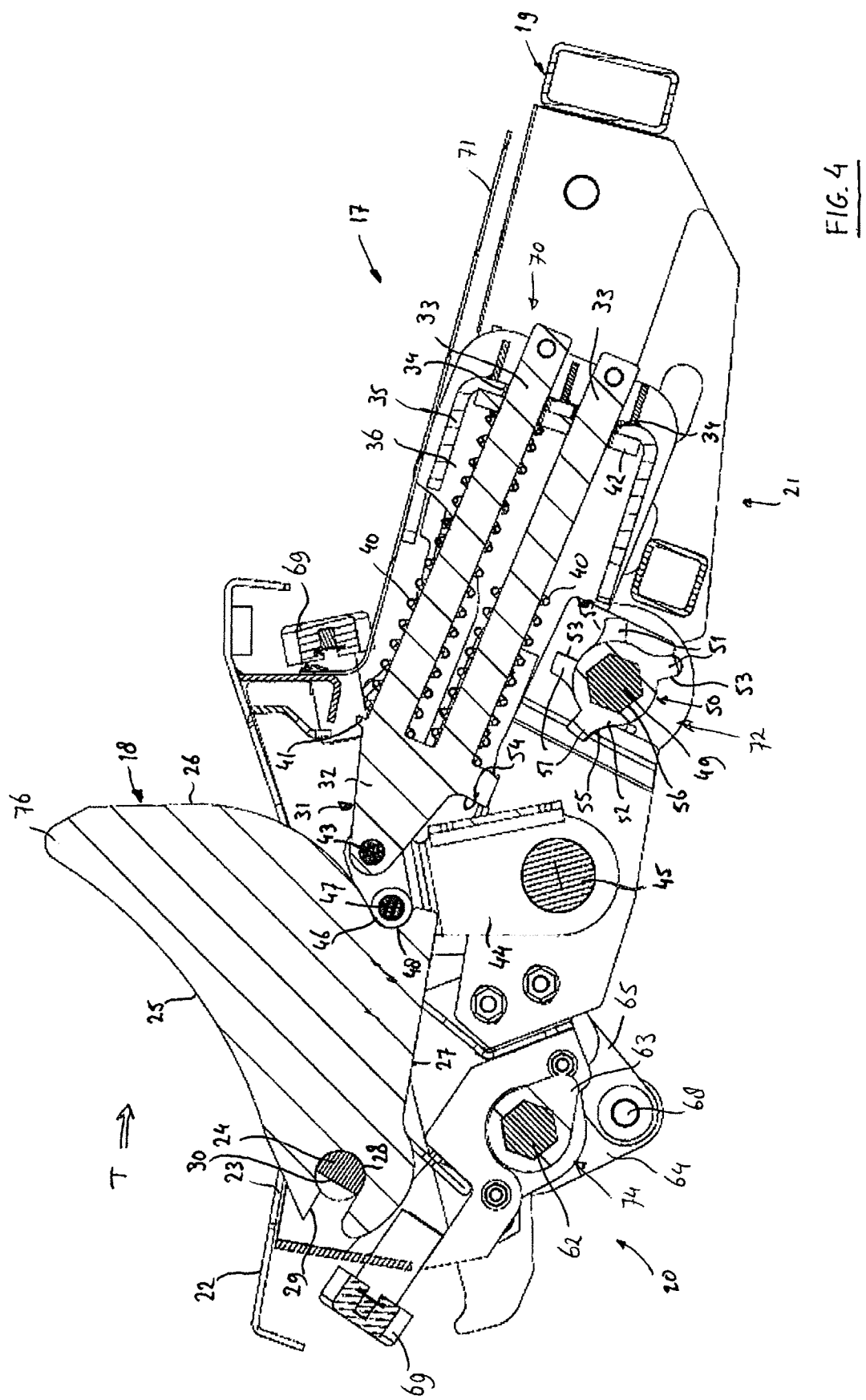
FIG. 4 is a cross-sectional view of the cutting device along the lines Iv-Iv in FIG. 3.
Figure 13:
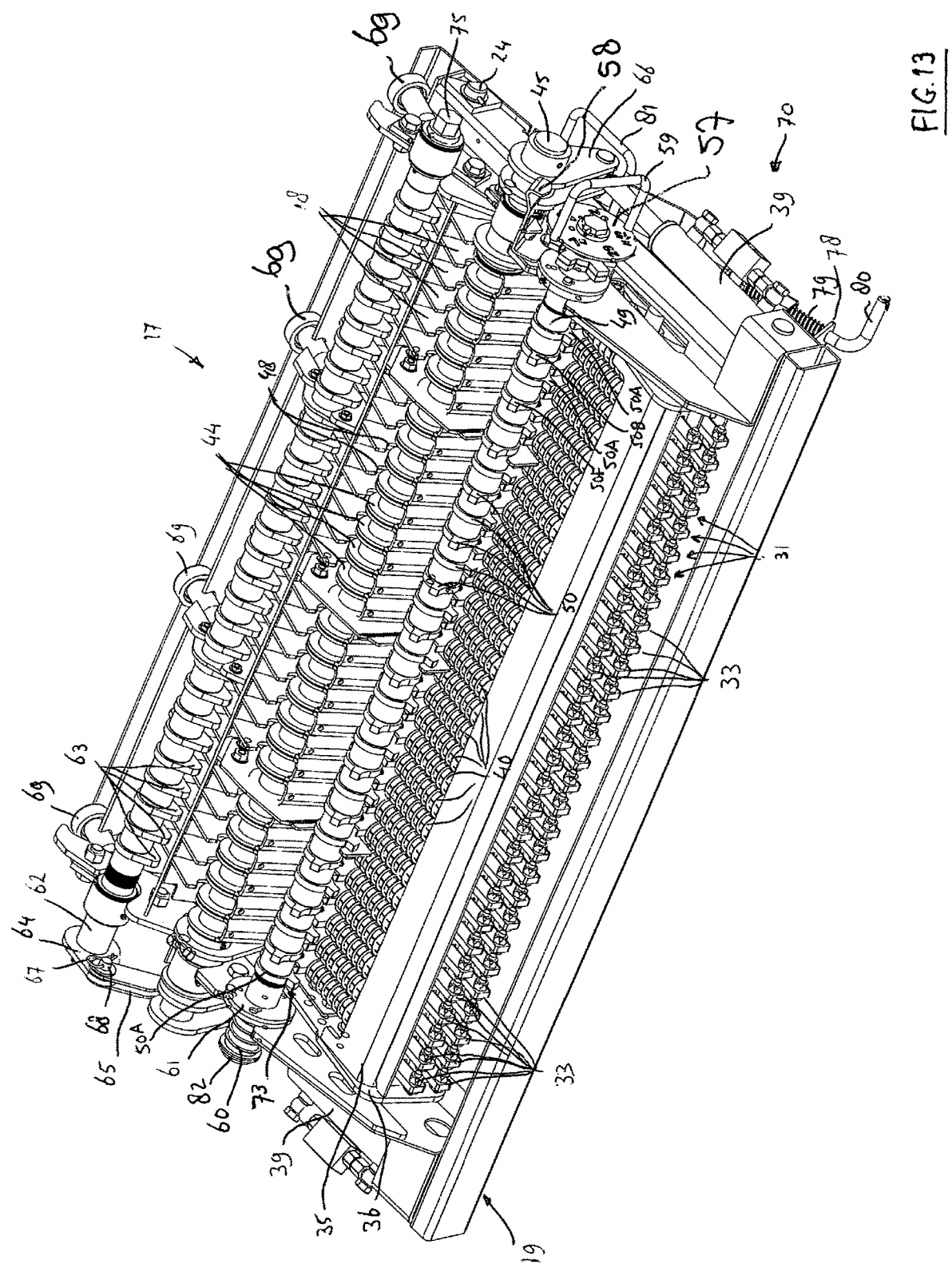
FIG. 13 is a perspective bottom view of the cutting device of FIG. 9 from the rear.

The actuating mechanism 70 comprises a plurality of operating members 31 associated with the knives 18. Each operating member 31 includes a body 32 and two legs 33 (FIG. 4). The legs 33 have free ends which extend through openings 34 in a transverse beam 35. This transverse beam 35, which also forms part of the actuating mechanism 70, is mounted between two opposite side plates 36, which are slidably arranged in the frame 19 (FIG. 13). At least one of the side plates 36 is connected to an end 37 of a piston rod 38 of a hydraulic actuator 39 (FIG. 3). A compression spring 40 is arranged around each leg 33 and is held between a protrusion 41 of the body 32 and a plate 42 arranged at the bottom of the transverse beam 35. Only the spring 40 surrounding the upper leg 33 is shown completely in the drawings, the lower spring 40 having been drawn only partially. Although in this embodiment each operating member 31 includes two legs 33 and two compression springs 40, the number of legs and springs could be higher or lower, depending on the spring force that is required and the space that is available. The body 32 is connected by means of a pin 43 to a crank 44 that is freely pivotable about a shaft 45. The crank 44 further carries a roller 46 which is rotatable around a shaft 47 and which rolls along the curved rear edge 26 of the knife 18.

The actuating mechanism 70 can be provided with a single hydraulic actuator 39, which may be arranged either at the right-hand side or on the left-hand side (FIG. 9) of the cutting device 17—considered in the direction of travel of the baler 1. In order to avoid excessive torsion in the actuating mechanism 70, this mechanism can also include hydraulic actuators 39 at both sides, each connected to one of the side plates 36.

The knives 18 are moved from their retracted inoperative position to their extended operative position by extending the hydraulic actuator 39, thus moving forward the piston rod 38, the side plate 36 and the transverse beam 35. This forward movement is transmitted to the body 32 of each operating member 31 by means of the compression springs 40, and results in a forward pivoting movement of the cranks 44. Thus the rollers 46 roll along the rear edge 26 of the knives 18, raising the knives through the slots 23 until each of the rollers 46 reaches a recess 48 in the knife 18 which forms a stop.

Because the body 32 of each operating member 31 is spring loaded, it may yield whenever the knife 18 encounters a load that is greater than the spring force of the corresponding pair of compression springs 40. This may occur e.g. if a stone or other obstacle is present in the crop that is being guided through the cutting device 17. In that case the knife 18 pivots rearwardly about the shaft 24, and forces the crank 44 to pivot rearwardly as well while the roller 46 moves to the rear along the rear edge 26 of the knife 18. This rearward motion of the crank 44 forces the operating member 31 to move to the rear as well, thus compressing the springs 40 between the body 32 and the plate 42 in the transverse beam 35. During this movement the ends of the legs 33 of the operating member 31 are free to extend through the openings 34 of the beam 35.

The ability to retract individual knives 18 while the actuating mechanism is in a position extending the set of knives can be advantageously used to provide a knife selection function. When all knives 18 are extended, the length to which the crop will be cut will correspond roughly to the spacing between adjacent knives 18. For some applications, it may be advantageous to cut the crop less finely. This can be achieved by extending only some of the knives 18. To this end the cutting device 17 includes a selector mechanism 72 that serves to hold one or more knives 18 in their retracted, inoperative position while the actuating mechanism 70 is operative to move a selection of the set of knives 18 to their extended positions.

Figure 12:
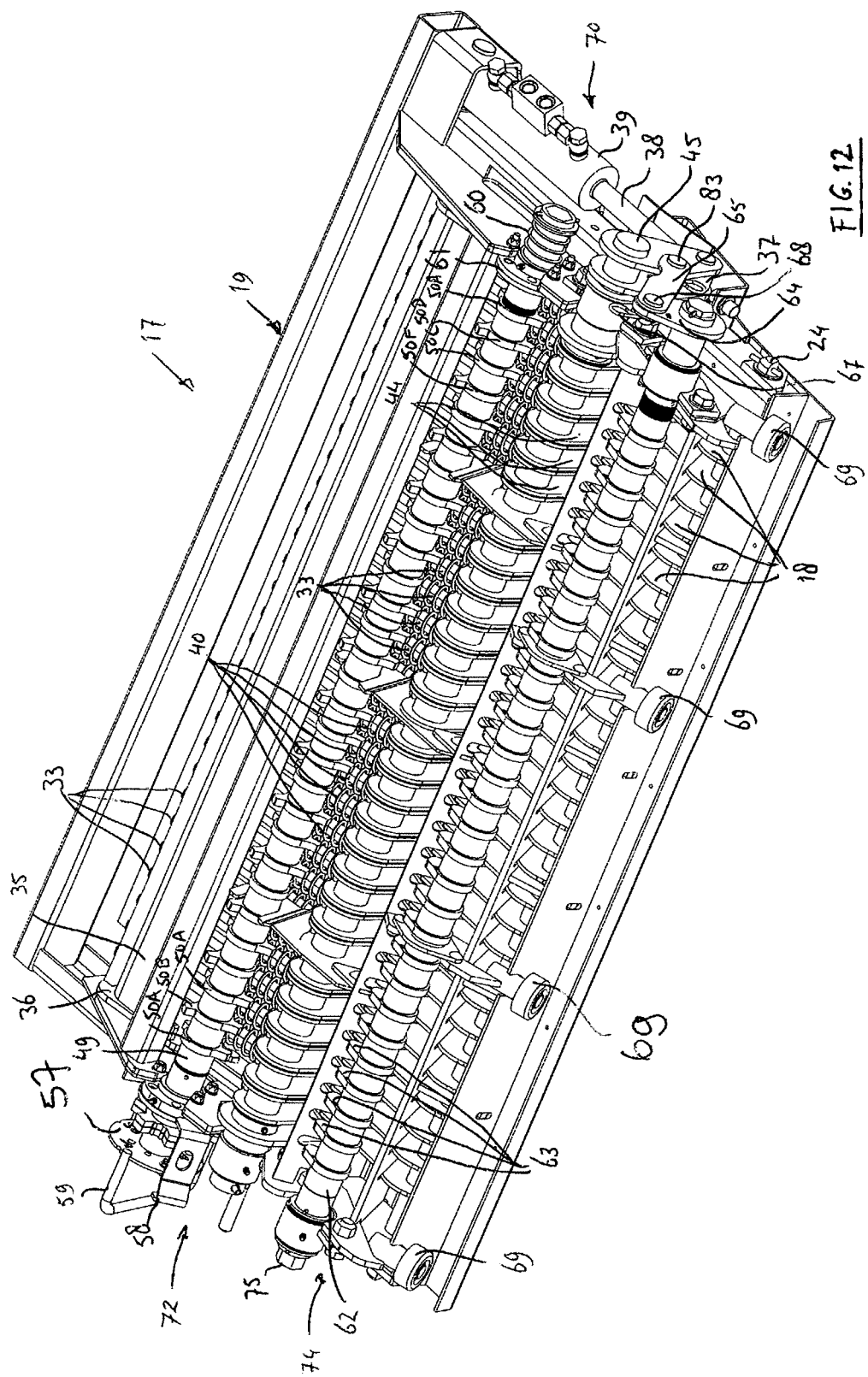
FIG. 12 is a perspective bottom view of the cutting device of FIG. 7 from the front.

The selector mechanism 72 includes a rotatable shaft 49 which extends below the operating members 31 in a direction perpendicular to the slots 23 (FIGS. 12, 13). The shaft 49 carries a plurality of individual cam elements 50A, 50B, 50C, 50D, 50E, 5OF which are substantially parallel and which are arranged on the shaft 49 with a spacing that corresponds with the spacing of the knives 18. Each of the cam elements 50A-F comprises a plurality of cams 51 which are spaced apart in peripheral direction of the shaft 49. These cams 51 are arranged at different positions on the periphery of a body 52 of the cam element 50. Each cam 51 has a contact surface 53 which extends in radial direction, which is intended to act as a stop for blocking forward movement of at least the spring loaded part of the operating member 31.

This contact surface 53 cooperates with a surface 54 on a protruding part of the body 32 of the operating member 31. Each cam 51 further has an inclined back part 55 which smoothly merges into the periphery of the cam element 50 in order to ensure optimal transmission of the blocking load into the cam element 50. The cam element 50 further has a central opening 56 of which the shape and dimensions match the cross-sectional shape and dimensions of the shaft 49. This shape is not rotationally symmetrical, so that a rotational force may be transmitted between the shaft 49 and the cam elements 50A-F. In the illustrated embodiment the shaft 49 has a hexagonal cross section, and so does the central opening 56. However, a circular cross-section with a flattened part, somewhat like the shape of the pivot shaft 24, is also conceivable.

Figure 8:
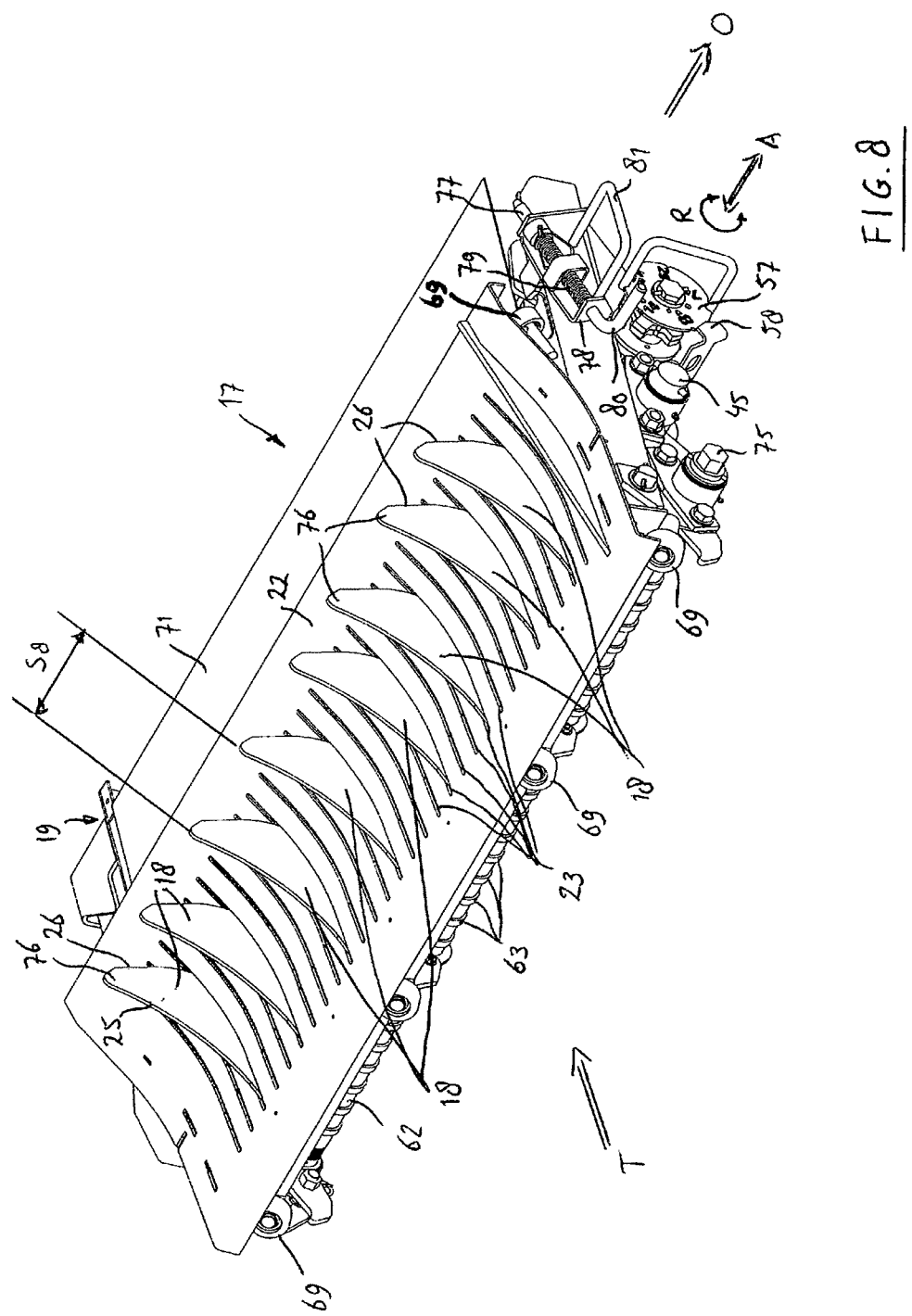
FIG. 8 is a view corresponding with FIG. 7, but showing part of the knives extended to their operative position and part of the knives held in their retracted position.
Figure 9:
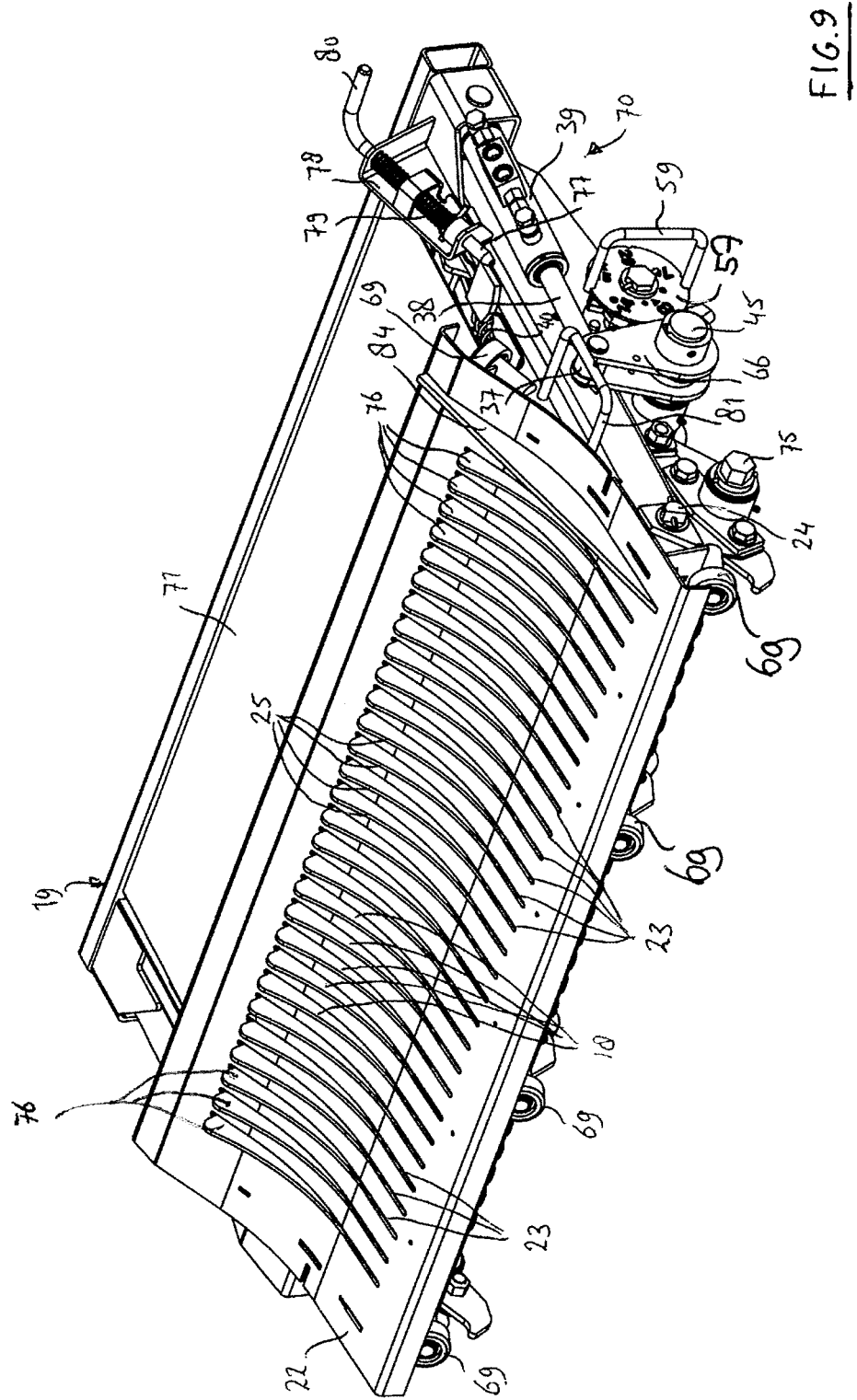
FIG. 9 is a view corresponding with FIG. 7, but showing an embodiment having hydraulic actuators on both sides of the frame, and showing the knives in the slightly extended position for replacement or removal.
Figure 10:
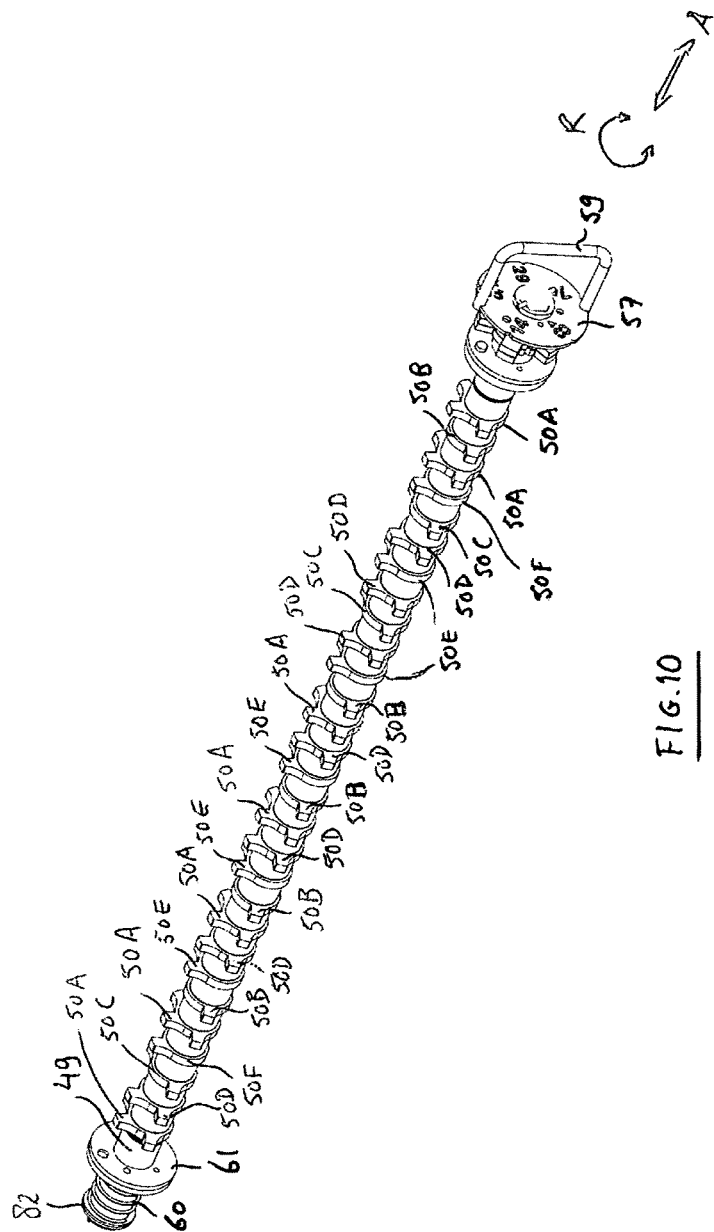
FIG. 10 shows a perspective view of the shaft and cam elements of the knife selector mechanism.
Figure 11:
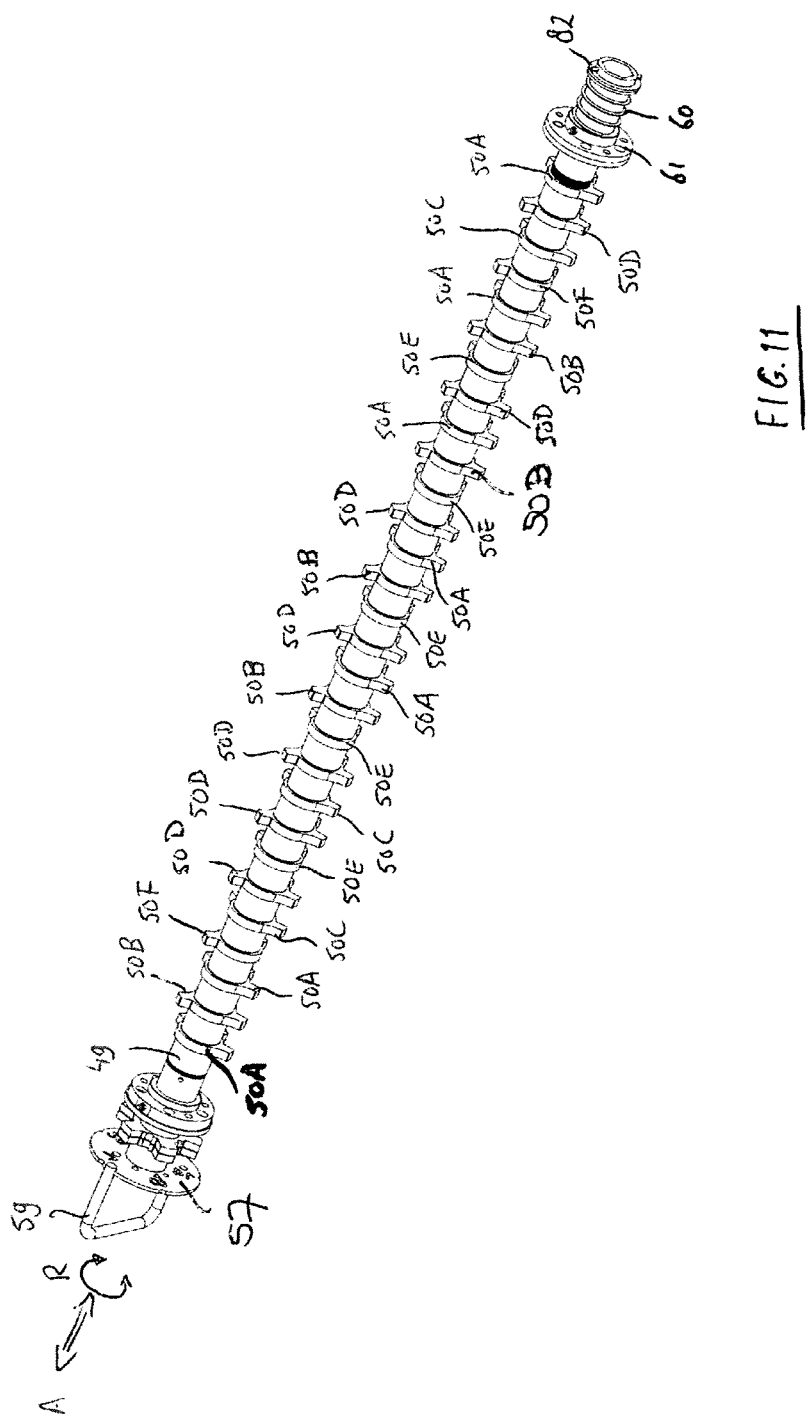
FIG. 11 is a perspective view of the shaft and cam elements from a different angle.

In the illustrated embodiments there are six different types of cam elements 50A-50F. These cam elements have two, three or four cams 51, which are arranged at different angular positions. In the illustrated embodiment, when the shaft 49 is in the position that is shown in FIG. 10, twenty-one of the twenty-nine cam elements 50A-F have a cam 51 which extends into the path of the corresponding operating member 31. In respect of these cam elements 50 the shaft 49 can be said to be in a holding position, whereas for the eight remaining cam elements 50 the shaft 49 is in a non-holding position, so that this position of the shaft 49 can be termed a partial holding position. In this partial holding position, twenty-one out of twenty-nine operating members 31 will be blocked, and only eight operating members 31 will be allowed to move their corresponding knives 18 to the extended position (FIG. 8). This is indicated by a number "8" on a position indicator 57 arranged at one end of the shaft 49, which cooperates with a pointer 58 that is fixed to the frame 19 (FIGS. 7-9, 13). In this arrangement the spacing of adjacent extended knives is s8, which defines the cutting length of the crop passing between the knives 18. When the shaft 49 is rotated over a given angle, a different combination of cams 51 will extend into the paths of the operating members 31, thus blocking a different number of operating members 31 and holding a different number of knives 18 in their retracted position. As shown on the indicator 57, the various cam elements 50A-50F arranged on the shaft 49 allow five different configurations in which seven, eight, fourteen, fifteen or all twenty-nine knives 18 are extended. All twenty-nine knives 18 are extended (FIGS. 3, 7) when the shaft 49 is in a position in which none of the cam elements 50 have a cam 51 extending into the path of the corresponding operating member 31. This is the complete or full non-holding position of the shaft 49. In this arrangement of the knives 18 their spacing s29 is much smaller than the spacing s8 when twenty-one intermediate knives 18 are held in their retracted position, so that the crop will be cut to a much smaller length.

In other embodiments there could be more or less than six different types of cam elements 50, allowing different numbers of knives 18 to be selected for extension or holding back. Moreover, the cam elements 50 may have more than four or less than two cams 51 in order to achieve different numbers of selected knives 18. In this way different cutting profiles offering a greater or smaller number of different cutting lengths may be selected. And while in the illustrated embodiment the cam elements 50 are arranged on the shaft 49 in such a manner that the operative and non-operative knives are substantially evenly distributed over the width of the cutting device 17, it is also conceivable to rearrange the cam elements 50 in order to achieve an uneven distribution. It may for instance be desirable to have a greater or smaller spacing near the sidewalls of the inlet channel 16, i.e. near the end of the row of knives 18. It is also conceivable to remove one or more cam elements 50 in case it would be desirable for one or more of the knives 18 to be selected for extension under all circumstances.

In order to allow the shaft 49 to be rotated to a different angular position as shown by arrow R, the cams 51 have to be moved away from the corresponding operating members 31. To this end the shaft 49 is slidable in the frame 19 in an axial direction (arrow A). The shaft 49 can be pulled outward by means of a handle 59 arranged at one end, and is biased back inward by e.g. a compression spring 60 arranged between a flange 61 and an end plate 82 at the opposite end of the shaft. The shaft 49 is locked in each angular position by a pin (not shown) cooperating with a hole (not shown) in the frame 19. The shaft 49 can only be rotated when the actuating mechanism 70 including the operating members 31 is in its first position, in which the knives 18 are retracted. To this end, the flange 61 is latched behind an edge 73 of the side plate 36 whenever the actuating mechanism 70 moves away from its first position (FIG. 13).

Figure 5:
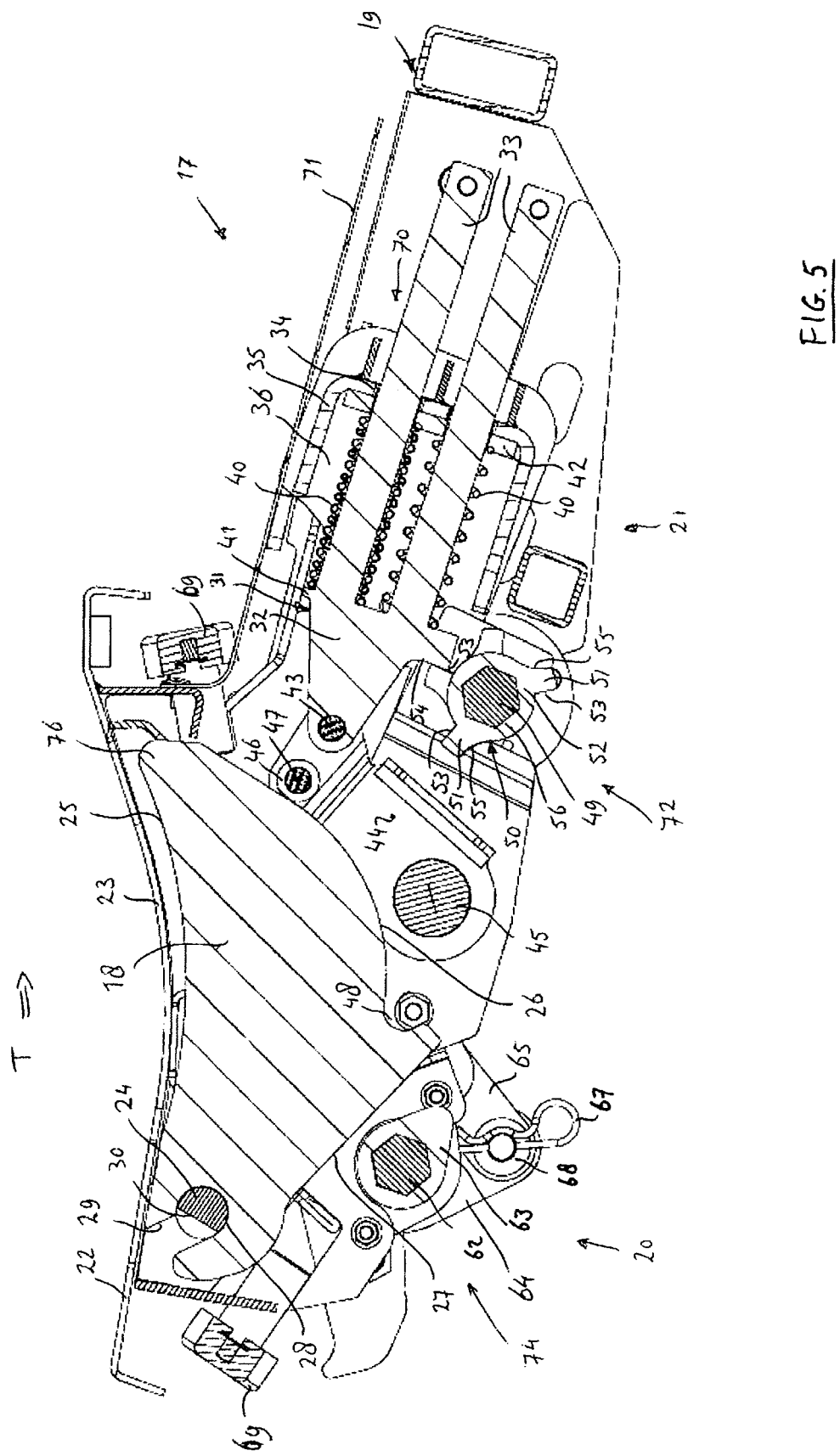
FIG. 5 is a view corresponding with FIG. 4, but showing the knife while it is being held in its retracted position during extension of other knives.

As shown in FIG. 5, when the knives 18 are in their inoperative position, they are completely retracted and lie entirely below the guide surface 22. This has the advantage that the guide surface 22 is unobstructed and there is no risk of crop becoming stuck between knife edges 25 which slightly extend from the surface 22, such as in many prior art devices. However, it is sometimes necessary to replace a knife 18 or to remove it for maintenance, e.g. sharpening. To this end, the knives 18 need to be accessible, so that a user may lift them out of the cutting device 17 by hand. Therefore, the cutting device 17 of the invention includes a lift mechanism 74.

This lift mechanism 74 includes a camshaft 62 arranged below the lower edge 27 of the knives 18 and extending perpendicular to the slots 23. The camshaft 62 carries a plurality of cams 63. During normal operation of the cutting device 17 (FIGS. 4, 5) the cams 63 must be held at a distance from the lower edges 27 of the knives 18, so as to allow the knives 18 to be fully retracted. To this end, the camshaft 62 is connected to the actuating mechanism 70 in the way shown in FIGS. 3, 12 and 13. A crank 64 at the end of the camshaft 62 is connected by means of a connecting pin 68 to an arm 65. This arm 65 is connected by way of a further connecting pin 83 to a crank 66, which in turn is actuated by the hydraulic actuator 39.

Figure 6:
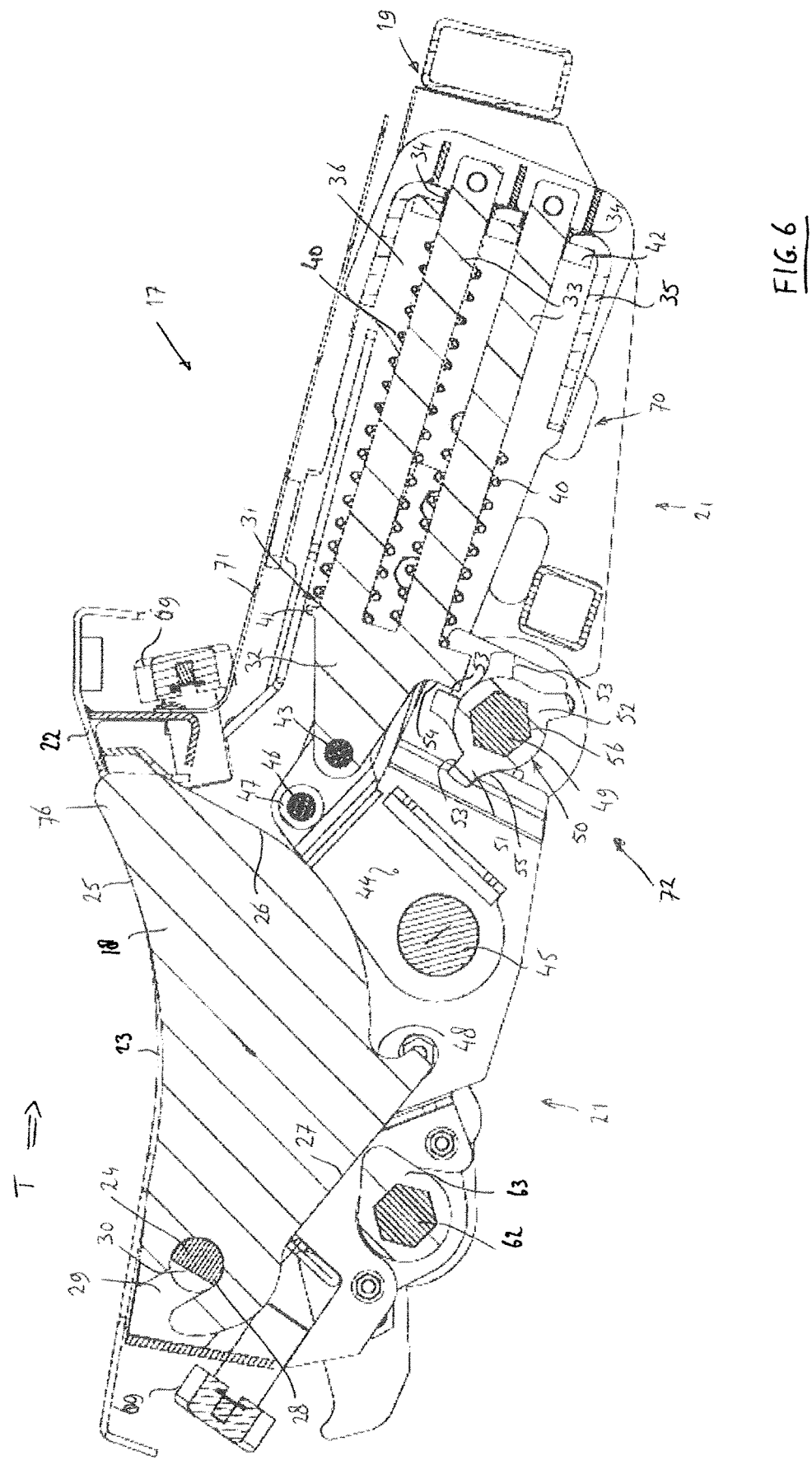
FIG. 6 is a view corresponding with FIG. 4 and FIG. 5 showing the knife while it is being lifted from its retracted position by the lifting mechanism.
Figure 7:
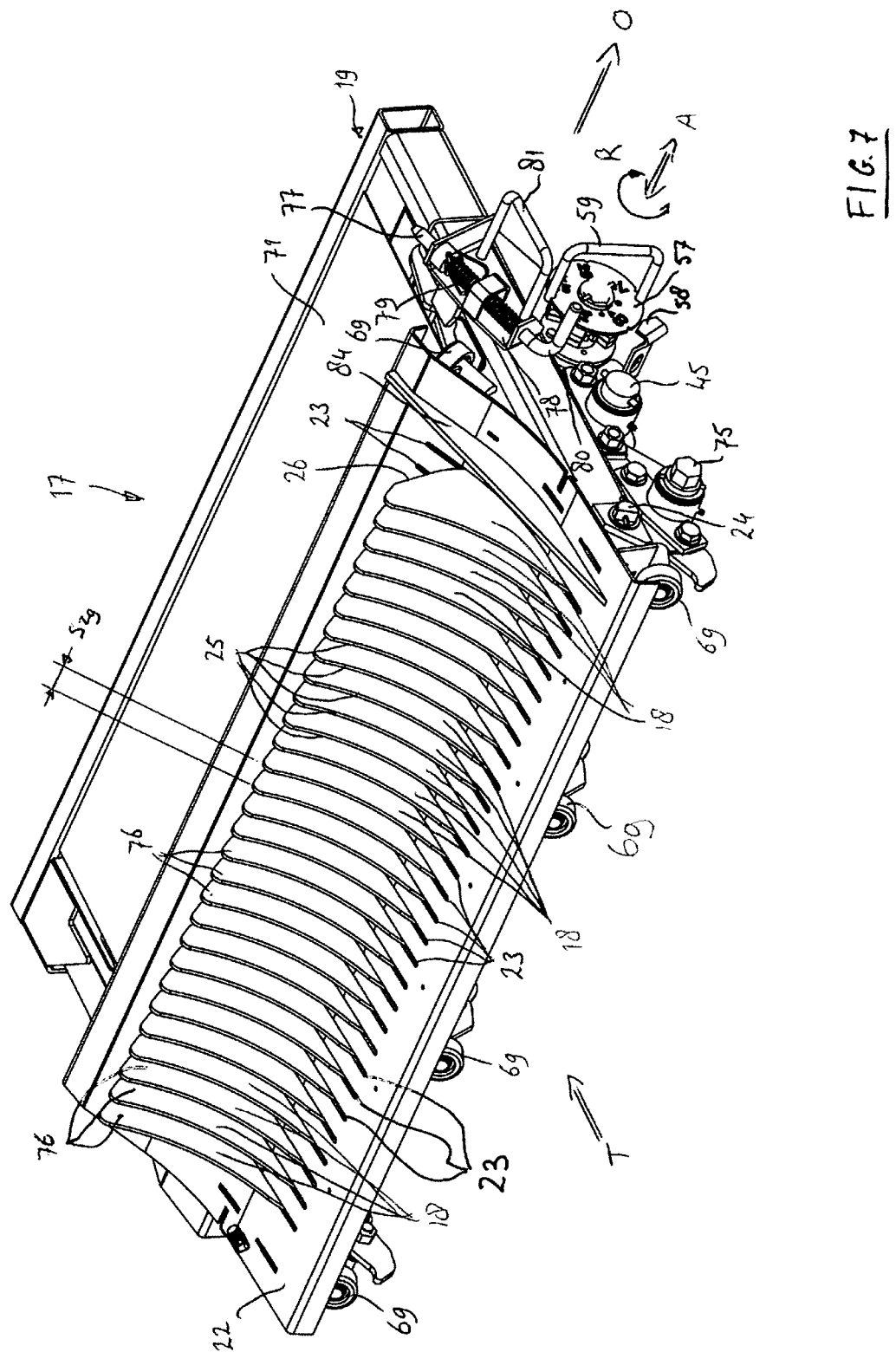
FIG. 7 is a perspective front view from the other side of the cutting device of FIG. 3 with the knives in their extended operative position, showing an embodiment having only a single hydraulic actuator.

When it is desired to remove one or more knives 18, this connection between the camshaft 62 and the actuator 39 is temporarily released by removing a safety pin 67 and a connecting pin 68. This can only be done when the knives 18 are in their inoperative, fully retracted position, i.e. when the actuating mechanism 70 is in its first position. By applying a tool (not shown) to a protruding end 75 of the camshaft 62, this camshaft 62 may then be manually rotated to a position in which the cams 63 almost contact the lower edges 27 of the knives 18. In this position the crank 64 can be reconnected to the arm 65 by reinserting the connecting pin 68 and safety pin 67. As a result of the rotation of the camshaft 62, the connecting pin 68 then lies above a line connecting the connecting pin 83 and the camshaft 62 so that the transmission between the cranks 66 and 64 has been reversed. Consequently, a pivoting movement of the crank 66 results in a pivoting movement in the same direction of the crank 64. Thus, a slight amount of rotation of the crank 66 by briefly operating the actuating mechanism will force the cams 63 against the lower edges 27 of the knives 18 and slightly lift the knives 18 just sufficiently for their tips 76 to protrude from the slots 23 (FIGS. 6, 9). After the knives 18 have been lifted by operating the lift mechanism 74, the user may pull on a protruding tip 76 of a knife 18 and rotate this to a nearly vertical position in which the knife 18 can be lifted off the pivot shaft 24. After the knives 18 have been removed or replaced, the camshaft 62 may be disconnected from the actuator 39 again and rotated back to its original position, in which it can then be reconnected to the actuator 39.

In order to prevent any peak loads on the guide plate 22 as a result of crop residue that may have accumulated in the lots 23 on top of the retracted knives 18 suddenly being forced out, the various cams 63 are arranged on the camshaft 62 at different angles, e.g. 5 degrees offset from one another. In this way the cams 63 contact the lower edges 27 of the various knives 18 at different angles of rotation of the camshaft 62, so that the knives 18 are forced upward sequentially and the crop residue is forced out more evenly.

The knife selector mechanism 72 according to the invention allows the cutting length of the cutting device 17 to be varied in an easy manner, thus increasing flexibility of the cutting device 17. Because the selector mechanism 72 allows two sets of more or less similar numbers of knives 18 to be selected simultaneously, i.e. seven or eight, and fourteen or fifteen, respectively, these sets of knives may be selected alternatingly, so that wear is more evenly divided and the cutting device 17 may be operated for a longer time between maintenance.

It should be noted that for maintenance purposes the frame 19 is provided with two rows of rollers 69, which are arranged to ride on rails (not shown) in the agricultural machine 1 in order to allow the cutting device 17 to be slid into and out of the agricultural machine 1, e.g. for maintenance or adjustment of the knives 18. A locking pin 77 cooperating with a hole (not shown) in the frame of the agricultural machine 1 prevents the cutting device 17 from being unintentionally removed from the machine. The locking pin 77 is arranged in a bracket 78 on the frame 19 and is biased to its locking position by e.g. a compression spring 79. The locking pin 77 can be released by pulling on a handle 80, after which the cutting device 17 can be slid out of the agricultural machine 1 in the direction of arrow O by pulling on a handle 81. In the shown embodiments the position and orientation of the locking pin is varied (compare FIGS. 7, 8 with FIG. 9), depending on whether or not an actuator 39 is present on the side of the cutting device 17 where the locking pin 77 is located.

Although the invention has been described above by reference to various exemplary embodiments thereof, it will be clear that it can be varied in many ways. The number of knives and operating members can be varied, depending on the dimensions of the agricultural machine. The design of the operating members and of the other parts of the actuating mechanism can be changed, depending on the space available, the loads to be expected, etc. And in particular, the knife selector mechanism could be used without the lift mechanism, if a slight edge of the knife would be allowed to extend from the slot in the retracted position. On the other hand, the lift mechanism for lifting fully retracted knives could also be used in combination with other knife selector mechanisms.

The scope of the invention is defined solely by the following claims.

What is claimed is:

1. A crop cutting device comprising:
    a guiding surface including a plurality of substantially parallel slots extending in a direction of travel of crop over the guiding surface;
    a plurality of knives pivotally mounted below the guiding surface, wherein each knife is aligned with a respective slot and is pivotable about an axis extending substantially perpendicular to the slots between a retracted inoperative position in which it is located substantially below the guiding surface and an extended operative position, wherein at least a cutting edge of the knife projects above the guiding surface;
    a plurality of movable operating members, wherein each operating member is associated with a respective knife and is movable from a first position in which the knife is in its retracted inoperative position to a second position in which the knife is in its extended operative position, and wherein each operating member includes a spring loaded part which allows the knife to move to its retracted inoperative position while the operating member is in its second position; and
    a selector mechanism for selectively holding at least the spring loaded part of at least one operating member to maintain a corresponding one of the plurality of knives in its retracted inoperative position while an operating member associated with another one of the plurality of knives is moved to its second position,
    wherein the selector mechanism includes a rotatable shaft extending substantially perpendicular to the slots and carrying a plurality of cam elements, wherein each cam element is arranged to be moved to a position for directly contacting and blocking a respective spring loaded part upon rotation of the shaft from a non-holding position to a holding position,
    wherein the cam elements are substantially parallel, and wherein each cam element is individually mounted on the shaft.

2. The crop cutting device according to claim 1, wherein at least some of the cam elements comprise a plurality of cams spaced apart in peripheral direction of the shaft.

3. The crop cutting device according to claim 2, wherein each cam has a contact surface extending from the shaft in radial direction and facing the spring loaded part, and an inclined back part.

4. The crop cutting device according to claim 1, wherein each cam element has a central opening of which the shape and dimensions match the cross-sectional shape and dimensions of the shaft.

5. The crop cutting device according to claim 1, wherein the shaft is axially movable between a locked position in which the cam elements are aligned with the spring loaded parts and an unlocked position in which the cam elements are offset with respect to the spring loaded parts and in which the shaft can rotate.

6. The crop cutting device according to claim 5, wherein the shaft is biased to its locked position.

7. The crop cutting device according to claim 5, wherein the shaft is arranged to be latched in its locked position when the operating members are not in their first position.

8. The crop cutting device according to claim 1, further comprising at least one actuator connected to the operating members for collectively moving the operating members between their first and second positions.

9. The crop cutting device according to claim 1, wherein in its retracted inoperative position each knife is located entirely below the guiding surface, and wherein the cutting device further comprises a lifting mechanism for raising at least a part of each knife above the guiding surface.

10. The crop cutting device according to claim 9, wherein the lifting mechanism comprises a camshaft arranged below the knives and extending substantially perpendicular to the slots, the camshaft comprising a cam for each knife.

11. The crop cutting device according to claim 10, wherein at least some of the cams are offset in an angular direction with respect to other cams.

12. The crop cutting device according to claim 9, further comprising at least one actuator connected to the operating members for collectively moving the operating members between their first and second positions, wherein the lifting mechanism is releasably connected to the at least one actuator.

13. An agricultural machine comprising:
a pickup for collecting a crop; and
a crop cutting device comprising:
   a guiding surface including a plurality of substantially parallel slots extending in a direction of travel of crop over the guiding surface;
   a plurality of knives pivotally mounted below the guiding surface, wherein each knife is aligned with a respective slot and is pivotable about an axis extending substantially perpendicular to the slots between a retracted inoperative position in which it is located substantially below the guiding surface and an extended operative position, wherein at least a cutting edge of the knife projects above the guiding surface;
   a plurality of movable operating members, wherein each operating member is associated with a respective knife and is movable from a first position in which the knife is in its retracted inoperative position to a second position in which the knife is in its extended operative position, and wherein each operating member includes a spring loaded part which allows the knife to move to its retracted inoperative position while the operating member is in its second position; and
   a selector mechanism for selectively holding at least the spring loaded part of at least one operating member to maintain the corresponding knife in its retracted inoperative position while an operating member associated with another knife is moved to its second position,
   wherein the selector mechanism includes a rotatable shaft extending substantially perpendicular to the slots and carrying a plurality of cam elements, wherein each cam element is arranged to be moved to a position for directly contacting and blocking a respective spring loaded part upon rotation of the shaft from a non-holding position to a holding position,
   wherein the cam elements are substantially parallel, and
   wherein each cam element is individually mounted on the shaft,
wherein the crop cutting device is arranged downstream of the pickup.

14. A method of cutting a crop, comprising the steps of:
guiding the crop in a direction of travel over a guiding surface from which a plurality of knives extend, the knives being arranged in a row substantially perpendicular to the direction of travel of the crop, so that a cutting length of the crop is defined by a spacing between adjacent knives in the row; and
varying the cutting length by preventing at least some of the knives in the row from extending from the guiding surface,
wherein the step of varying the cutting length includes mounting cam elements on a rotatable shaft and rotating the shaft from a non-holding position, in which the cam elements leave the knives free to extend, to a holding position, in which the cam elements directly contact and prevent the at least some of the knives from extending from the guiding surface, and
wherein the cam elements are individually mounted on the rotatable shaft.

15. The method of claim 14, wherein the individual cam elements have at least two different configurations including different numbers of cams.

16. The method of claim 14, wherein the individual cam elements are releasably mounted on the shaft and wherein the step of varying the cutting length further includes releasing the cam elements from the shaft, rearranging the cam elements, and remounting the rearranged cam elements on the shaft.

* * * * *